United States Patent
Allen et al.

(10) Patent No.: US 10,558,711 B2
(45) Date of Patent: *Feb. 11, 2020

(54) DEFINING DYNAMIC TOPIC STRUCTURES FOR TOPIC ORIENTED QUESTION ANSWER SYSTEMS

(71) Applicant: International Business Machines Corporation, Armonk, NY (US)

(72) Inventors: Corville O. Allen, Morrisville, NC (US); Joseph N. Kozhaya, Morrisville, NC (US); Christopher M. Madison, Charlotte, NC (US); Sai P. Peddi, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/860,784

(22) Filed: Sep. 22, 2015

(65) Prior Publication Data

US 2016/0371277 A1 Dec. 22, 2016

Related U.S. Application Data

(63) Continuation of application No. 14/740,508, filed on Jun. 16, 2015.

(51) Int. Cl.
*G06F 16/93* (2019.01)
*G06F 16/28* (2019.01)
*G06F 16/901* (2019.01)

(52) U.S. Cl.
CPC ............ *G06F 16/93* (2019.01); *G06F 16/285* (2019.01); *G06F 16/9024* (2019.01)

(58) Field of Classification Search
USPC .................................................. 707/738, 741
See application file for complete search history.

(56) References Cited

U.S. PATENT DOCUMENTS 6,112,203 A * 8/2000 Bharat .................. G06F 17/218
6,154,213 A * 11/2000 Rennison .......... G06F 17/30716
345/428

(Continued)

FOREIGN PATENT DOCUMENTS

JP 2013254420 A 12/2013
WO 2010105214 A2 9/2010

OTHER PUBLICATIONS

IBM, "List of IBM Patents or Patent Application Treated as Related (Appendix P)," Sep. 22, 2015, p. 1-2.

(Continued)

*Primary Examiner* — Cam Linh T Nguyen
(74) *Attorney, Agent, or Firm* — Robert C. Bunker

(57) ABSTRACT

According to one exemplary embodiment, a method for dynamically defining topics from content objects used to answer a question in a question answering system is provided. The method may include receiving the content objects. The method may include identifying the topics within the received content objects. The method may include generating a graph based on the identified plurality of topics, whereby nodes map to the topics. The method may include calculating edge weights associated with each edge based on semantic relations associated with the topics. The method may include determining if the calculated edge weight associated an edge exceeds a threshold value. The method may include generating a combination topic based on determining that the edge weight associated with the edge exceeds the threshold value.

6 Claims, 7 Drawing Sheets

(56) References Cited

U.S. PATENT DOCUMENTS

| | | | |
|---|---|---|---|
| 6,321,220 B1* | 11/2001 | Dean | G06F 17/30864 707/726 |
| 6,810,376 B1 | 10/2004 | Guan et al. | |
| 7,017,114 B2* | 3/2006 | Guo | G06F 17/27 707/999.001 |
| 8,024,332 B2 | 9/2011 | Cao et al. | |
| 8,577,884 B2 | 11/2013 | Poteet | |
| 8,732,204 B2 | 5/2014 | Chua et al. | |
| 8,856,124 B2 | 10/2014 | Jing | |
| 8,887,044 B1* | 11/2014 | Goodspeed | G06F 3/0483 715/202 |
| 8,892,672 B1* | 11/2014 | Rackliffe | H04L 51/32 709/206 |
| 8,983,977 B2 | 3/2015 | Ishikawa et al. | |
| 9,183,323 B1 | 11/2015 | Shaw | |
| 9,299,024 B2 | 3/2016 | Bagchi et al. | |
| 9,336,485 B2 | 5/2016 | Haggar et al. | |
| 9,514,190 B2 | 12/2016 | Clifford et al. | |
| 9,720,977 B2 | 8/2017 | Jamrog et al. | |
| 9,842,166 B1 | 12/2017 | Leviathan et al. | |
| 9,959,364 B2 | 5/2018 | Jain | |
| 2003/0182631 A1 | 9/2003 | Tsochantaridis et al. | |
| 2004/0181757 A1* | 9/2004 | Brady | G06F 17/3089 715/255 |
| 2004/0213455 A1* | 10/2004 | Lossev | G06K 9/222 382/159 |
| 2006/0195463 A1* | 8/2006 | Bogner | G06Q 10/10 |
| 2009/0112588 A1 | 4/2009 | Kummamuru et al. | |
| 2010/0030769 A1 | 2/2010 | Cao et al. | |
| 2010/0063797 A1 | 3/2010 | Cong et al. | |
| 2010/0076978 A1 | 3/2010 | Cong et al. | |
| 2010/0235311 A1 | 9/2010 | Cao et al. | |
| 2010/0235343 A1 | 9/2010 | Cao et al. | |
| 2011/0252121 A1* | 10/2011 | Borgs | G06F 17/30867 709/223 |
| 2012/0209590 A1 | 8/2012 | Huerta et al. | |
| 2012/0290950 A1* | 11/2012 | Rapaport | H04L 51/32 715/753 |
| 2013/0013291 A1 | 1/2013 | Bullock et al. | |
| 2013/0097167 A1 | 4/2013 | St. Jacques, Jr. et al. | |
| 2013/0198240 A1* | 8/2013 | Ameri-Yahia | G06Q 30/02 707/798 |
| 2013/0263181 A1* | 10/2013 | Impollonia | H04N 21/812 725/32 |
| 2014/0098103 A1* | 4/2014 | Hirsch | G06T 11/206 345/440 |
| 2014/0280224 A1* | 9/2014 | Feinberg | G06F 17/30958 707/748 |
| 2014/0280307 A1 | 9/2014 | Gupta et al. | |
| 2014/0298199 A1 | 10/2014 | Johnson, Jr. et al. | |
| 2014/0358928 A1 | 12/2014 | Alkov et al. | |
| 2015/0006537 A1 | 1/2015 | Jenkins et al. | |
| 2015/0074095 A1 | 3/2015 | Enders et al. | |
| 2015/0188941 A1* | 7/2015 | Boshmaf | H04L 63/1441 726/22 |
| 2015/0324456 A1 | 11/2015 | Kim et al. | |
| 2016/0019280 A1 | 1/2016 | Unger et al. | |
| 2016/0034757 A1* | 2/2016 | Chhichhia | G06K 9/00469 382/206 |
| 2016/0063061 A1* | 3/2016 | Meyerzon | G06F 17/30477 707/749 |
| 2016/0063115 A1* | 3/2016 | Ayan | G06Q 50/01 707/722 |
| 2016/0154727 A1* | 6/2016 | Broomhall | G06F 11/3672 717/124 |
| 2016/0198005 A1* | 7/2016 | Brewer | H04L 67/16 709/204 |
| 2016/0203523 A1* | 7/2016 | Spasojevic | G06Q 30/0269 705/14.66 |
| 2016/0232157 A1* | 8/2016 | Mansour | G06F 17/30011 |
| 2016/0232241 A1* | 8/2016 | Stoyanov | G06F 16/9535 |
| 2016/0371393 A1 | 12/2016 | Allen et al. | |
| 2017/0091188 A1 | 3/2017 | Allen et al. | |
| 2017/0091314 A1 | 3/2017 | Allen et al. | |

OTHER PUBLICATIONS

Allen et al., "Defining Dynamic Topic Structures for Topic Oriented Question Answer Systems," Application and Drawings, Filed on Jun. 16, 2015, p. 1-36, U.S. Appl. No. 14/740,508.

ACL, "TextGraphs-5: Graph-based Methods for Natural Language Processing," 2010 Workshop on Graph-based Methods for Natural Language Processing Proceedings, Jul. 16, 2010, p. 1-109, The Association for Computational Linguistics, Uppsala University, Uppsala, Sweden.

Dali et al., "Question Answering Based on Semantic Graphs," WWW 2009, Apr. 2009, 7 Pages, Jožef Stefan Institute, Madrid, Spain.

Gómez-Adorno et al., "Graph-based Approach to the Question Answering Task Based on Entrance Exams," CEUR Workshop Proceedings, CLEF 2014, Sep. 15-18, 2014, p. 1395-1403, vol. 1180, Sheffield, UK.

Kurata et al., "GDQA: Graph Driven Question Answering System," NTCIR-4 QAC2 Experiments, Working Notes of NTCIR-4, Jun. 2-4, 2004, 7 Pages, National Institute of Informatics, Tokyo.

Mell et al., "The NIST Definition of Cloud Computing," National Institute of Standards and Technology, Sep. 2011, p. 1-3, Special Publication 800-145.

Mollá, "Learning of Graph-based Question Answering Rules," HLT-NAACL 2006 Workshop on TextGraphs, Jun. 2006, p. 37-44, Association for Computational Linguistics, New York City.

Paranjpe, "Clustering Semantically Similar and Related Questions," Stanford Natural Language Processing Final Project, 2007, 8 Pages.

Seo et al., "High Precision Retrieval Using Relevance-Flow Graph," SIGIR'09, Jul. 19-23, 2009, 2 Pages, ACM, Boston, Massachusetts, USA.

Vargas-Vera et al., "AQUA: An Ontology-Driven Question Answering System," AAAI Technical Report SS-03-07, 2003, 5 Pages, American Association for Artificial Intelligence.

Zhang et al., "A Topic Clustering Approach to Finding Similar Questions from Large Question and Answer Archives," PLoS ONE, Mar. 2014, p. 1-8, vol. 9, Issue 3.

IBM, "List of IBM Patents or Patent Applications Treated as Related (Appendix P)," Jan. 29, 2018, p. 1-2.

* cited by examiner

DEFINING DYNAMIC TOPIC STRUCTURES FOR TOPIC ORIENTED QUESTION ANSWER SYSTEMS

BACKGROUND

The present invention relates generally to the field of computing, and more particularly to topic oriented question answer systems.

When presented with a question, a topic oriented question answer system identifies the most relevant topics to that question from a corpus of knowledge and returns the topics as candidate answers.

SUMMARY

According to one exemplary embodiment, a method for dynamically defining a plurality of topics from at least one content object used to answer a question in a question answering system is provided. The method may include receiving the at least one content object. The method may also include identifying the plurality of topics within the received at least one content object. The method may then include generating a graph based on the identified plurality of topics, whereby the generated graph includes a plurality of nodes connected by a plurality of edges, and whereby the plurality of nodes map to the identified plurality of topics. The method may further include calculating edge weights associated with each edge within the plurality of edges based on semantic relations associated with the plurality of topics. The method may also include determining if the calculated edge weight associated an edge within the plurality of edges exceeds a threshold value. The method may then include generating a combination topic based on determining that the edge weight associated with the edge within the plurality of edges exceeds the threshold value.

According to another exemplary embodiment, a computer system for dynamically defining a plurality of topics from at least one content object used to answer a question in a question answering system is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the at least one content object. The method may also include identifying the plurality of topics within the received at least one content object. The method may then include generating a graph based on the identified plurality of topics, whereby the generated graph includes a plurality of nodes connected by a plurality of edges, and whereby the plurality of nodes map to the identified plurality of topics. The method may further include calculating edge weights associated with each edge within the plurality of edges based on semantic relations associated with the plurality of topics. The method may also include determining if the calculated edge weight associated an edge within the plurality of edges exceeds a threshold value. The method may then include generating a combination topic based on determining that the edge weight associated with the edge within the plurality of edges exceeds the threshold value.

According to yet another exemplary embodiment, a computer program product for dynamically defining a plurality of topics from at least one content object used to answer a question in a question answering system is provided. The computer program product may include one or more computer-readable storage devices and program instructions stored on at least one of the one or more tangible storage devices, the program instructions executable by a processor. The computer program product may include program instructions to receive the at least one content object. The computer program product may also include program instructions to identify the plurality of topics within the received at least one content object. The computer program product may then include program instructions to generate a graph based on the identified plurality of topics, whereby the generated graph includes a plurality of nodes connected by a plurality of edges, and whereby the plurality of nodes map to the identified plurality of topics. The computer program product may further include program instructions to calculate edge weights associated with each edge within the plurality of edges based on semantic relations associated with the plurality of topics. The computer program product may also include program instructions to determine if the calculated edge weight associated an edge within the plurality of edges exceeds a threshold value. The computer program product may then include program instructions to generate a combination topic based on determining that the edge weight associated with the edge within the plurality of edges exceeds the threshold value.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
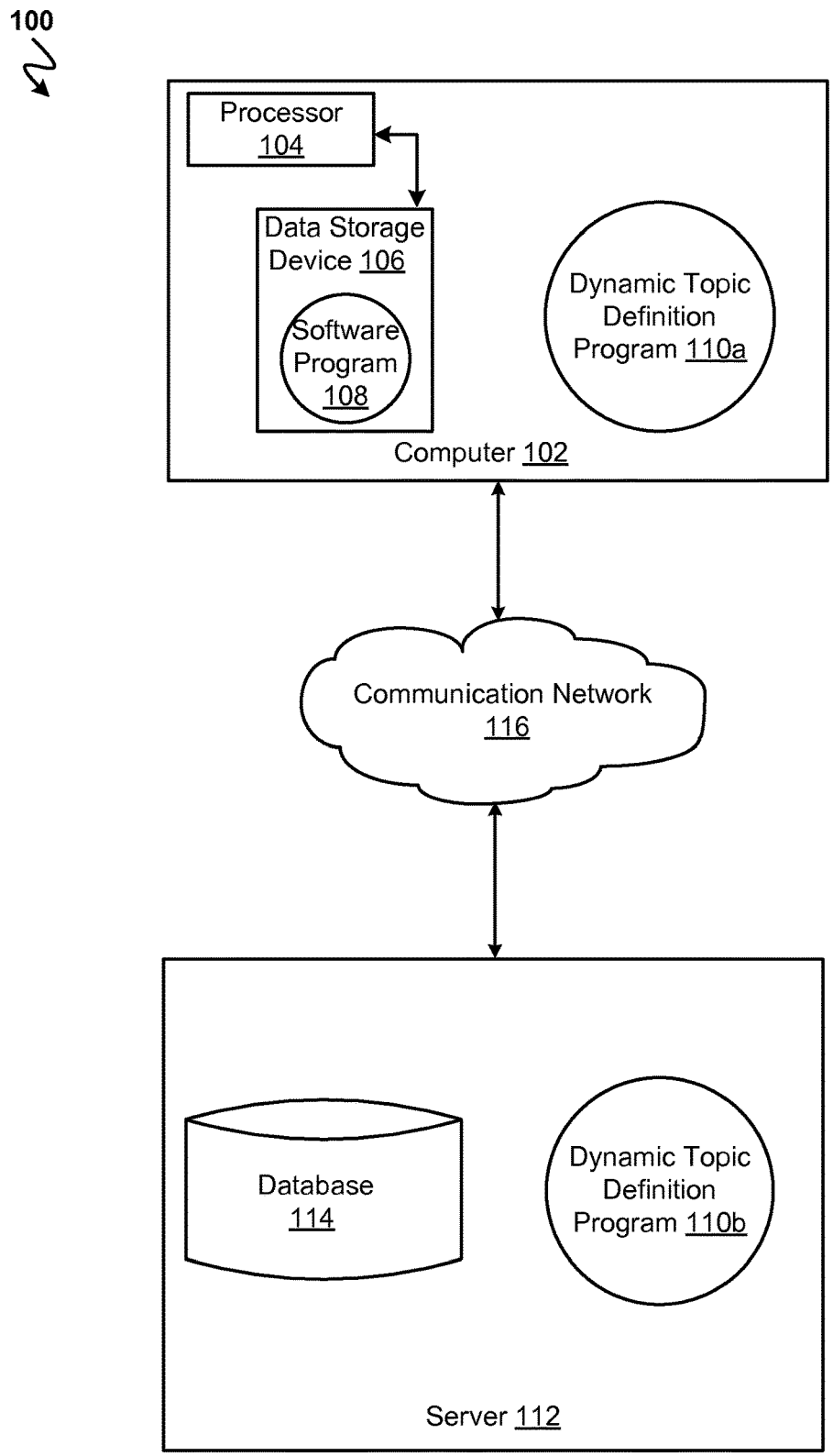
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamically defining topic structures in a topic oriented question answer system. As such, the present embodiment has the capacity to improve the technical field of answering questions using a topic oriented question answer system by determining related topics to group into a single supertopic within a document or between related documents. More specifically, input documents are broken down into topics that are used to populate a graph. Edges between topics, represented within the graph as nodes, are then assigned edge weights based on semantic relationships between topics. Topics connected by an edge having an edge weight that exceeds a threshold value are combined into a supertopic that combines two or more topics. Topics and supertopics are then used to answer questions within a topic oriented question answer system.

Existing topic oriented pipelines execute by breaking a corpus of N documents into K sub-documents (i.e., topics) based on the structure of the original documents. The structure of the document may be defined by the use of formatting tags, such as H tags (or headings in the case of .doc files or fonts in the case of a .pdf file).

When presented with a question, the topic oriented pipeline identifies the most relevant topic(s) to that question and returns those identified topic(s) as the answers. Topic definition within existing topic oriented question answer systems are static and based on the structure of the documents that limits determining the best answers to a variety of questions.

Therefore, it may be advantageous to, among other things, provide a way to dynamically define topics to determine clearer and more concise answers to questions received by a topic oriented question answer system.

According to at least one embodiment, two or more topics are dynamically combined into a supertopic (i.e., combination topic) based on semantic relations between topics or based on user provided ground truth. The supertopics become candidate answers during primary search and scoring phases of the topic oriented question answer system. The supertopics are aligned based on similarity, semantic relationships, surface forms, placement within a passage that can be correlated, and meaning attribution of a sentence within a passage (e.g., conclusion, starter, and summarization).

Dynamically defining supertopics begins with ingesting documents and creating topics based on the document structure using known methods. The created topics are then used to populate a graph structure as nodes.

Edges between topics are created and assigned edge weights based on the semantic relationship or relevance between topics. Edge weights may be assigned according to a comparison between the two topics connected by an edge. Edge weights may be decided based on the similarity of sentences within topics, similar surface forms for core concepts for the domain or topic, concept similarity, or sentence alignment within a passage and their similarity to other sentences in other passages. Sentence alignment may be based on proximity and placement (e.g., before, after, "conclusion", "opening"). For example, sentences that are associated with a conclusion may use specific words or phrases that may be identified by parsing the text of the passage, such as "end," "in summary," "in conclusion," "based on the above," etc. Similarly, sentences associated with openings may use specific words or phrases that may be identified by parsing the text of the passage using known methods.

Topics to be compared may exist at the same or different levels of hierarchy within the same document. Topics to be compared may also exist in different documents if the documents belong to the same cluster as defined by a user. For example, documents associated with the same company may belong to the same cluster or documents referencing a date or a range of dates such as quarterly Security Exchange Commission filing documents may belong to the same cluster.

For topics that are strongly connected (i.e., the edge weight assigned to the edge between topics corresponds to a stronger connection), supertopics are created that encompass the strongly connected topics. Supertopics can consist of two or more topics that have edge weights higher that a predetermined threshold value.

Additionally, supertopics may be specified by users via training. As users upload question-answer pairs to their ground truth, the users can specify multiple topics as the answer to a question that results in defining strong connections between subtopics specified by the user as answers to a question.

As questions get passed to the pipeline of the topic oriented question answer system, candidate answers are identified from the topics and supertopics that were created by merging strongly connected subtopics.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic topic definition program 110a. The networked computer environment 100 may also include a server 112 that is enabled to run a dynamic topic definition program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic topic definition program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic topic definition program 110a, 110b (respectively) to generate supertopics from corpus documents that may be used to help generate answers to questions in a topic oriented question answer system. Dynamic topic definition is explained in more detail below with respect to FIGS. 2, 3, and 4.

Figure 2:
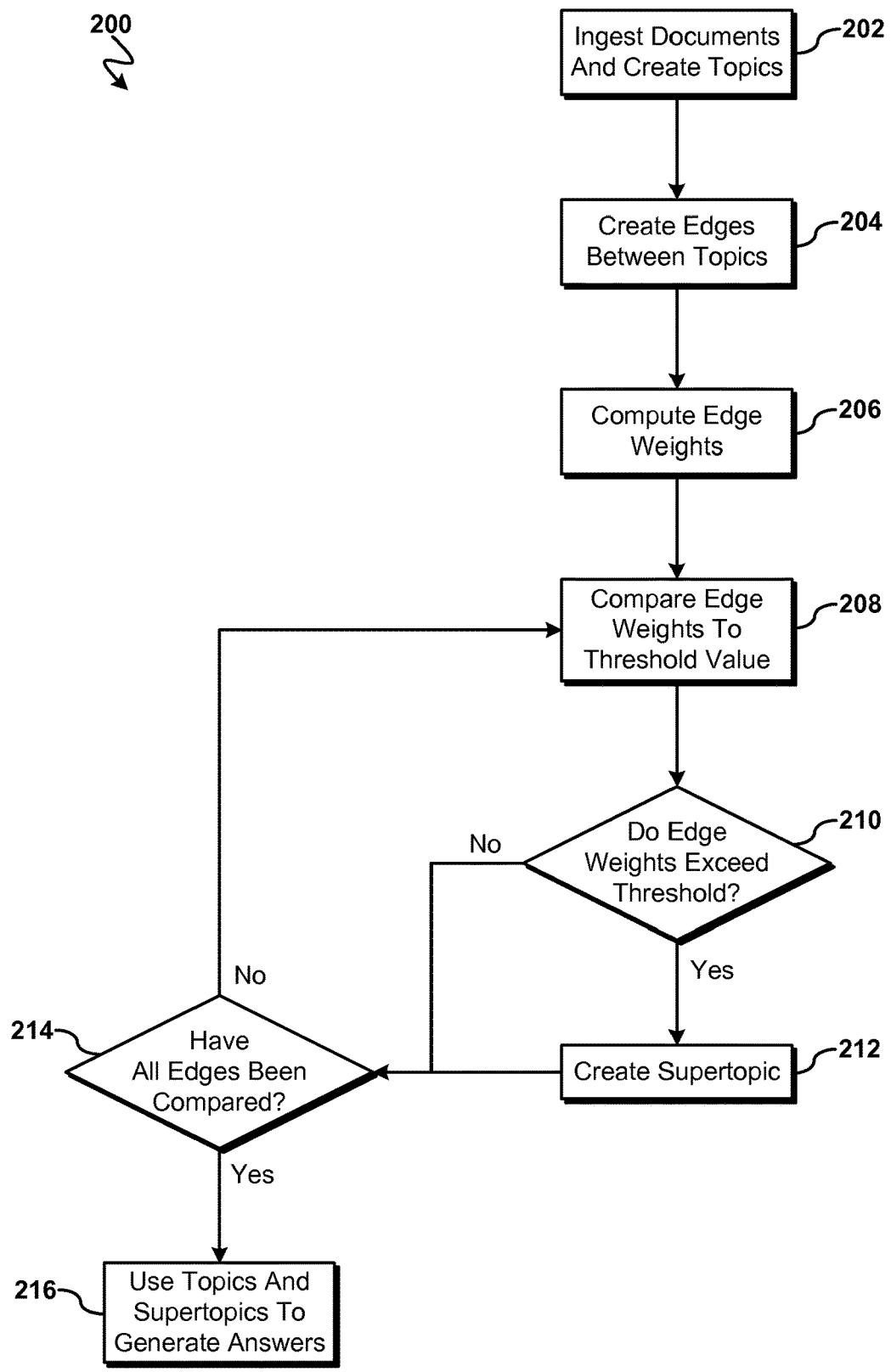
FIG. 2 is an operational flow chart illustrating a process for dynamically defining topics according to at least one embodiment.

Referring now to FIG. 2, an operational flow chart illustrating the steps 200 by an algorithm to dynamically defining topics in a topic oriented question answer system according to at least one embodiment is depicted.

At 202, documents (i.e., content objects) are ingested and topics are created. According to at least one embodiment, document ingest and topic creation are handled according to known methods used by topic oriented question answer systems.

For example, a document describing International Business Machines Corporation (IBM® (IBM and all IBM— based trademarks and logos are trademarks or registered trademarks of International Business Machines Corporation and/or its affiliates)) may be ingested. The document may be formatted as follows:
<title> International Business Machines Company Profile</title>
<h1>Full Description</h1>
International Business Machines Corporation (IBM®), incorporated on Jun. 16, 1911, is an information technology (IT) company.
<h2>Divisions</h2>
IBM® includes the following divisions:
<h3>Global Technology Services (GTS)</h3>
GTC's services include Strategic Outsourcing Service . . . .
<h3>Global Business Services (GBS)</h3>
IBM's services in this segment include Consulting and Systems Integration, and Application Management Services.
<h3>Software</h3>
Middleware software enable clients to integrate systems, processes and applications across a standard software platform.
<h3>Watson</h3>
Watson is IBM's lead into cognitive space . . . .
<h2>Officers and Directors</h2>
<h3>Chief Executive Officer (CEO)</h3>
Mrs. Virginia M. Rometty is Chairman of the Board, President, Chief Executive Officer of International Business Machines Corporation.
<h3>Chief Financial Officer (CFO)</h3>
Mr. Martin J. Schroeter is the Chief Financial Officer and Senior Vice President—Finance and Enterprise Transformation of International Business Machines Corporation.
<h3>Senior Vice President, IBM Watson™</h3>
Mike Rhodin is Senior Vice President, IBM Watson™.

Based on the ingested document, static topics are identified. Continuing with the above example document, topics may be identified by the tags used to indicate title and headers (e.g., <title></title>, <h3></h3>, etc.). The example document would result in topics, such as:
Topic 1: International Business Machines Company Profile: Full Description: Divisions
Topic 2: International Business Machines Company Profile: Full Description: Divisions: Global Technology Services (GTS)
Topic 3: International Business Machines Company Profile: Full Description: Divisions: Global Business Services (GBS)
Topic 4: International Business Machines Company Profile: Full Description: Divisions: Watson Next, at 204, edges between topics are created. Once the topics have been created based on the ingested document, a graph structure is created having a node for each topic. According to at least one embodiment, edges are made between each node within the graph (i.e., resulting in a complete graph). Additionally, edges connecting topics between two or more documents may be created for documents belonging to the same cluster as defined, for example, by a user. For instance, documents associated with the same company may belong to the same cluster or documents referencing a date or a range of dates such as quarterly Security Exchange Commission filing documents may belong to the same cluster.

Then, at 206, an edge weight is computed and assigned to each edge within the graph. According to at least one embodiment, edge weight is assigned by comparing the similarity between two topics. Passages of text (i.e., text strings) associated with two topics may be compared using known comparison methods to determine sentence similarity (i.e., generate a similarity value) and generate the edge weight based on the determined sentence similarity. Similarity may be determined based on similar surface forms or core concepts contained within the passages associated with the topics being compared.

Similarity measures may also take into account sentence alignment within a passage associated with a topic and their similarity to other sentences in other passages. For example, a sentence may appear as a conclusion to a paragraph or to a topic within a document. If the other passage that the sentence is compared with has similar features (e.g., core concepts) in a conclusion sentence, the similarity between the passages will be greater. Determining if a sentence occurs at a conclusion or opening is based on identifying where the sentence occurs in a passage (e.g., a conclusion often occurs at the end of a passage) or by identifying terms/phrases that indicate the purpose of the sentence (e.g., "in summary," or "in conclusion").

Using the complete graph, all topics within the graph are analyzed based on similarity to another topic until all possible topic pairs have been analyzed. Since all topic pairs are analyzed, topics may be compared at the same or different levels of hierarchy (e.g., a topic that is associated with an <h1> tag can be compared for similarity with a different topic associated with an <h3> tag).

According to at least one embodiment, the edge weights may also be normalized to be a number between zero and one using known normalization methods.

According to at least one embodiment, as each edge in the complete graph is analyzed based on semantic similarity between topics, edges that correspond to weak or nonexistent semantic relationships are removed from the graph. For example, a minimum threshold value may be predefined, such as 0.20. As edge weights are computed, if an edge is determined to have an edge weight (e.g., 0.10) that is below the minimum threshold, that edge is removed from the graph. Filtering out semantically insignificant edges creates a more efficient graph as irrelevant edges are no longer present within the graph.

At 208, edge weights in the graph are compared against a threshold value that indicates sufficient semantic relationship to form a supertopic. According to at least one embodiment, the threshold value indicating sufficient semantic relations exist to merge topics into a supertopic is set by a user-defined value, or algorithm, or by some other method. For example, a user may set the supertopic threshold value to 0.70, indicating that topics connected by an edge with an edge weight of 0.70 or greater are semantically similar enough to be combined to form a supertopic. The supertopic threshold value is stored in a data repository, such as a database 114 (FIG. 1), and read when the edge weight comparison is made. The edge weight for each edge in the graph structure is read from the data structure storing the edge weights associated with the graph (e.g., array, linked list, etc.).

Then, at 210, it is determined if the edge weight value exceeds the supertopic threshold value. According to at least one embodiment, if the edge weight associated with an edge in the graph exceeds the supertopic threshold value, the topics at the ends of the edge are determined to have sufficient semantic relations to be merged into a supertopic. Determining if edge weights exceed the supertopic threshold value continues iteratively to search for additional topics to add to the supertopic connected by an edge to topics already within the supertopic. Thus, supertopics include two or more topics. As described previously, edges joining topics may span multiple documents, thus supertopics may also include topics from multiple documents.

As edges are iteratively analyzed, the topics connected to the edge that exceeds the supertopic threshold value are added to a topic pool and unanalyzed edges connected to the topics within the topic pool are analyzed to find if any additional topics will be added to the topic pool. Once there are no longer any unanalyzed edges from topics within the topic pool, no further edge weight analysis will be made with respect to the current topic pool.

Additionally, according to at least one embodiment, edges are compared with the supertopic threshold value that are N topics removed from the first topic in the supertopic. For example, topic 1 and topic 2 may have an edge joining them with an edge weight (e.g., 0.90) that exceeds the supertopic threshold value (e.g., 0.70) and thus topic 1 and topic 2 are added to a topic pool. Thereafter, topic 2 and topic 3 may have an edge joining them with an edge weight (e.g., 0.95) that exceeds the supertopic threshold value (0.70) and thus topic 3 (that is one topic removed from topic 1) would be added to the topic pool that now contains topics 1, 2, and 3. Similarly, topic 3 may have an edge to topic 4 (that is two topics removed from topic 1) with an edge weight of 0.80 that exceeds the supertopic threshold value. Thus, topic 4 would be added to the topic pool.

According to at least one other embodiment, as edge weights for topics that are further removed from the first topic (e.g., topic 1) are compared with the supertopic threshold value, the supertopic threshold value may be modified. For example, if the edge being analyzed connects to a topic that is three or more topics removed from the first topic added to the topic pool, the supertopic threshold value may be increased by 10% for that comparison. The threshold value may also dynamically scale based on how far removed the topic is from the first topic in the topic pool. For example, for each topic removed (i.e., separated) from the first topic, the supertopic threshold may be scaled up by 3%. Thus, there is control for how topics are added based on how far removed the current topic is from the first topic.

If an edge weight was determined to exceed the supertopic threshold value at 210, a supertopic is created at 212. According to at least one embodiment, the topic pool generated at 210 is used to create the supertopic once there are no more topics to add to the topic pool. For example, if the topic pool generated at 210 includes topics 1, 2, and 4 the resulting supertopic 1, 2, 4 will be created.

However if the edge weight analyzed does not exceed the supertopic threshold value at 210 or if a supertopic was created at 212, it is then determined if all edges within the graph have been compared against the supertopic threshold value at 214.

If it is determined that there are edges within the graph that have not been compared with the supertopic threshold value at 214, the process will return to 208 to compare another edge weight to the supertopic threshold value.

However, if it is determined that all edges within the graph that have been compared with the supertopic threshold value at 214, then the topics and any supertopics that were formed will be used by the topic oriented question answer system to generate answers at 216.

Figure 3:
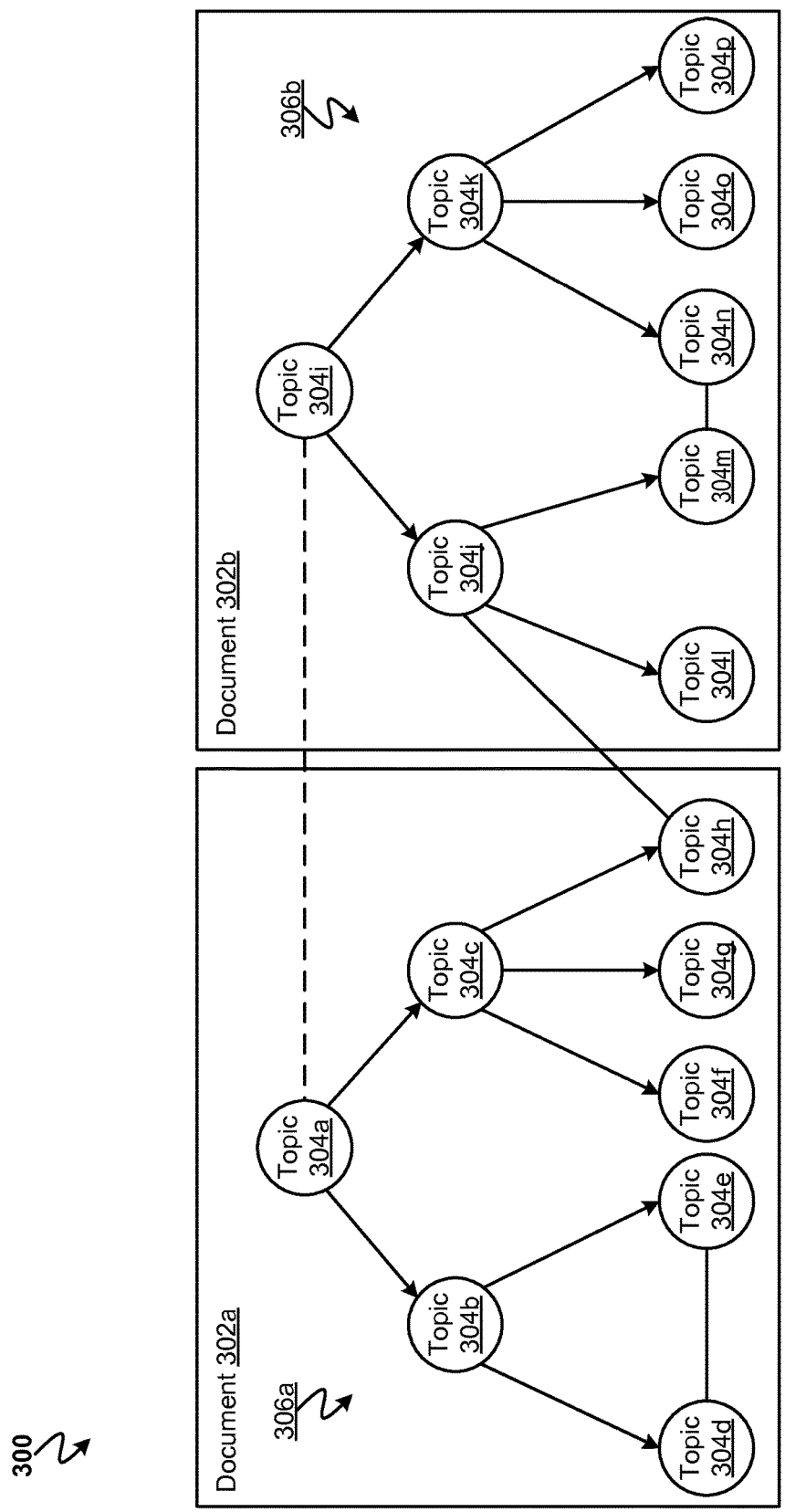
FIG. 3 illustrates example topic graphs according to at least one embodiment.

Referring now to FIG. 3, an example of two documents that have been ingested and represented as a pair of topic graphs 300 is depicted according to at least one embodiment.

Once document 302a has been ingested, topics 304a-h are identified, as described previously at 202 (FIG. 2), and used to populate topic graph 306a based on the hierarchy of the topics 304a-h within document 302a. Similarly, document 302b is ingested and topics 304i-p are identified and used to populated topic graph 306b. Documents 302a and 302b may be designated as being related based on user-provided training. Initially, graph 306a is generated as a complete graph where all topics 304a-h are connected by edges, as described previously at 204 (FIG. 2). Graph 306b is also initially generated as a complete graph. Since document 302a and 302b have been designated as related documents, topics 304a-h in graph 306a have edges to all topics 304i-p in graph 306b. As described previously at 206 (FIG. 2), edge weights are computed for all edges and edges with edge weights not meeting a minimum threshold value are removed from graphs 306a and 306b. The resulting graphs 306a and 306b are depicted as the pair of topic graphs 300 after edges that did not meet the minimum threshold value were removed.

Figure 4:
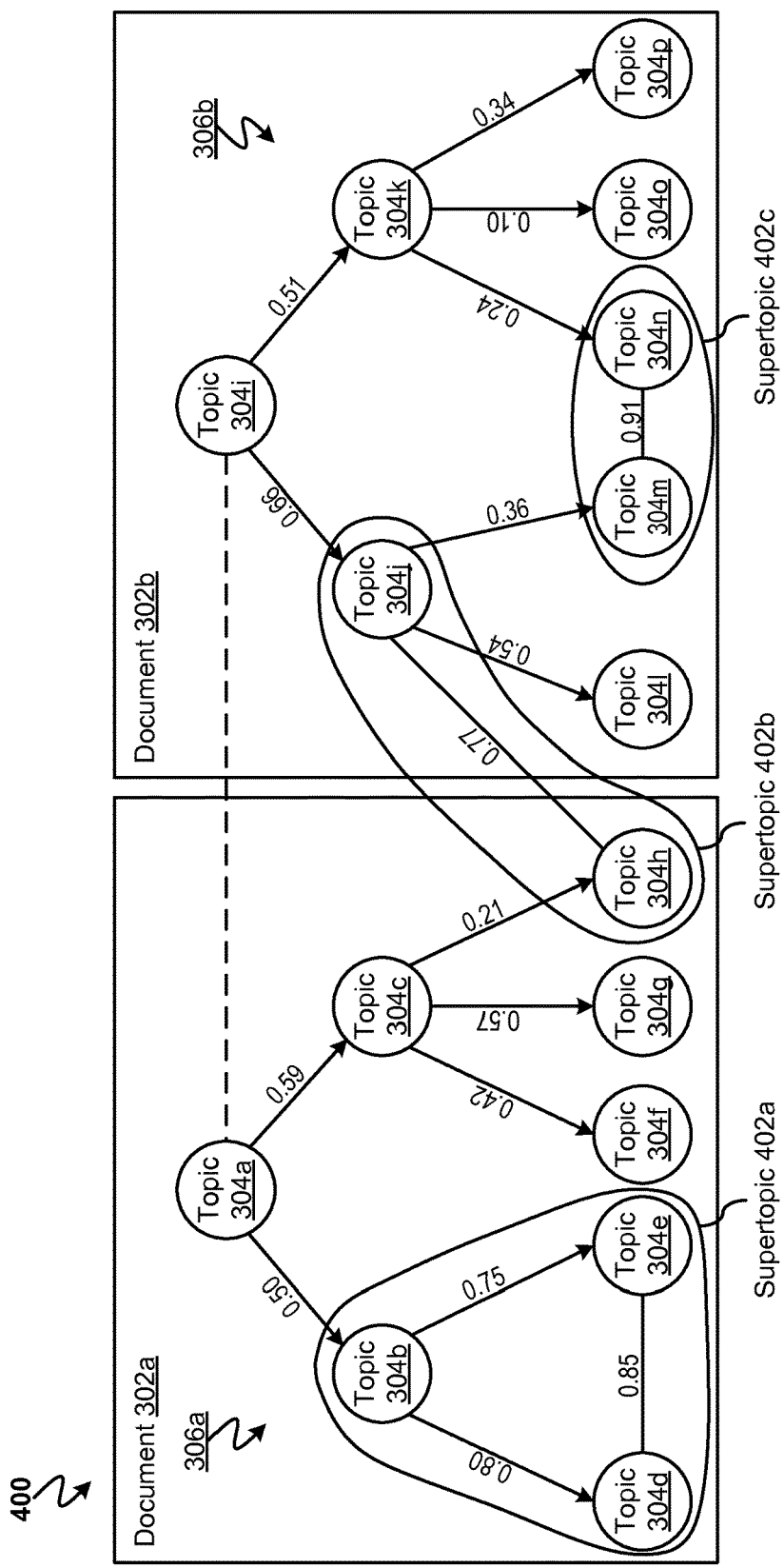
FIG. 4 illustrates example topic graphs with identified supertopics according to at least one embodiment.

Referring now to FIG. 4, an example of two documents that have been ingested and represented as a pair of topic graphs with supertopics identified 400 and edge weights assigned is depicted according to at least one embodiment.

As edge weights are compared to the supertopic threshold value, as previously described at 210 (FIG. 2), supertopics 402a-402c are identified and formed as previously described at 212 (FIG. 2).

In a scenario when the supertopic threshold value is 0.70, the edge weight for the edge between topic 304b and 304d is 0.80, the edge weight for the edge between topic 304b and 304e is 0.75, and the edge weight for the edge between topic 304d and 304e is 0.85, supertopic 402a is formed from topics 304b, 304d, and 304e within document 302a. However, topic 304a may not be included in supertopic 402a if the edge weight assigned to the edge from topic 304b to 304a is 0.50 and thus does not exceed the supertopic threshold value of 0.70.

Similarly, if the edge weight for the edge between topic 304h and 304j is 0.77, supertopic 402b is formed from topics 304h and 304j between related documents 302a and 302b since the edge weight (i.e., 0.77) exceeds the supertopic threshold value (i.e., 0.70). However, topics 304c, 304i, 304*l*, and 304*m* may not be included within supertopic 402*b* if the edge weights assigned to edges from 304*h* and 304*j* to adjacent topics (i.e., 304*c*, 304*i*, 304*l*, and 304*m*) do not exceed the supertopic threshold value (i.e., 0.70).

Finally, if the edge weight for the edge between topic 304*m* and 304*n* is 0.91, supertopic 402*c* is formed from topics 304*m* and 304*n* within document 302*b* since the edge weight (i.e., 0.91) exceeds the supertopic threshold value (i.e., 0.70).

If a topic oriented question answer system ingested document 302*a*, topic 304*c* may include the passage "What is the management of skin and soft-tissue infections (SSTIs) in the era of community-associated MRSA (CA-MRSA)." Topic 304*h* may include the heading "Pediatric Considerations", resulting in the topic string "What is the management of skin and soft-tissue infections (SSTIs) in the era of community-associated MRSA (CA-MRSA): Pediatric Considerations." Document 302*b* may also be ingested and topic 304*i* may include the passage "Methicillin-resistant *Staphylococcus aureus* (MRSA) infection." Topic 304*k* may include the heading "CA-MSRA on the Rise" and topic 304*j* may include the heading "Treatment of CA-MRSA Infection."

If the topic oriented question answer system receives the question "What are MRSA treatment options for pediatric patients?" and the topic oriented question answer system is utilizing the pair of topic graphs 300 depicted in FIG. 3 (i.e., without supertopics), the topic oriented question answer system would return topic 304*h* (i.e., "What is the management of skin and soft-tissue infections (SSTIs) in the era of community-associated MRSA (CA-MRSA): Pediatric Considerations") as a first answer and 304*j* (i.e., "Methicillin-resistant *Staphylococcus aureus* (MRSA) infection: Treatment of CA-MRSA Infection") as a second answer.

However, if the topic oriented question answer system is utilizing the pair of topic graphs with supertopics identified 400 as depicted in FIG. 4 having supertopic 402*b*, the topic oriented question answer system would return supertopic 402*b* (i.e., "What is the management of skin and soft-tissue infections (SSTIs) in the era of community-associated MRSA (CA-MRSA): Pediatric Considerations," "Methicillin-resistant *Staphylococcus aureus* (MRSA) infection: Treatment of CA-MRSA Infection") as the first answer.

It may be appreciated that FIGS. 2, 3, and 4 provide only an illustration of one embodiment and does not imply any limitations with regard to how different embodiments may be implemented. Many modifications to the depicted embodiment(s) may be made based on design and implementation requirements.

Figure 5:
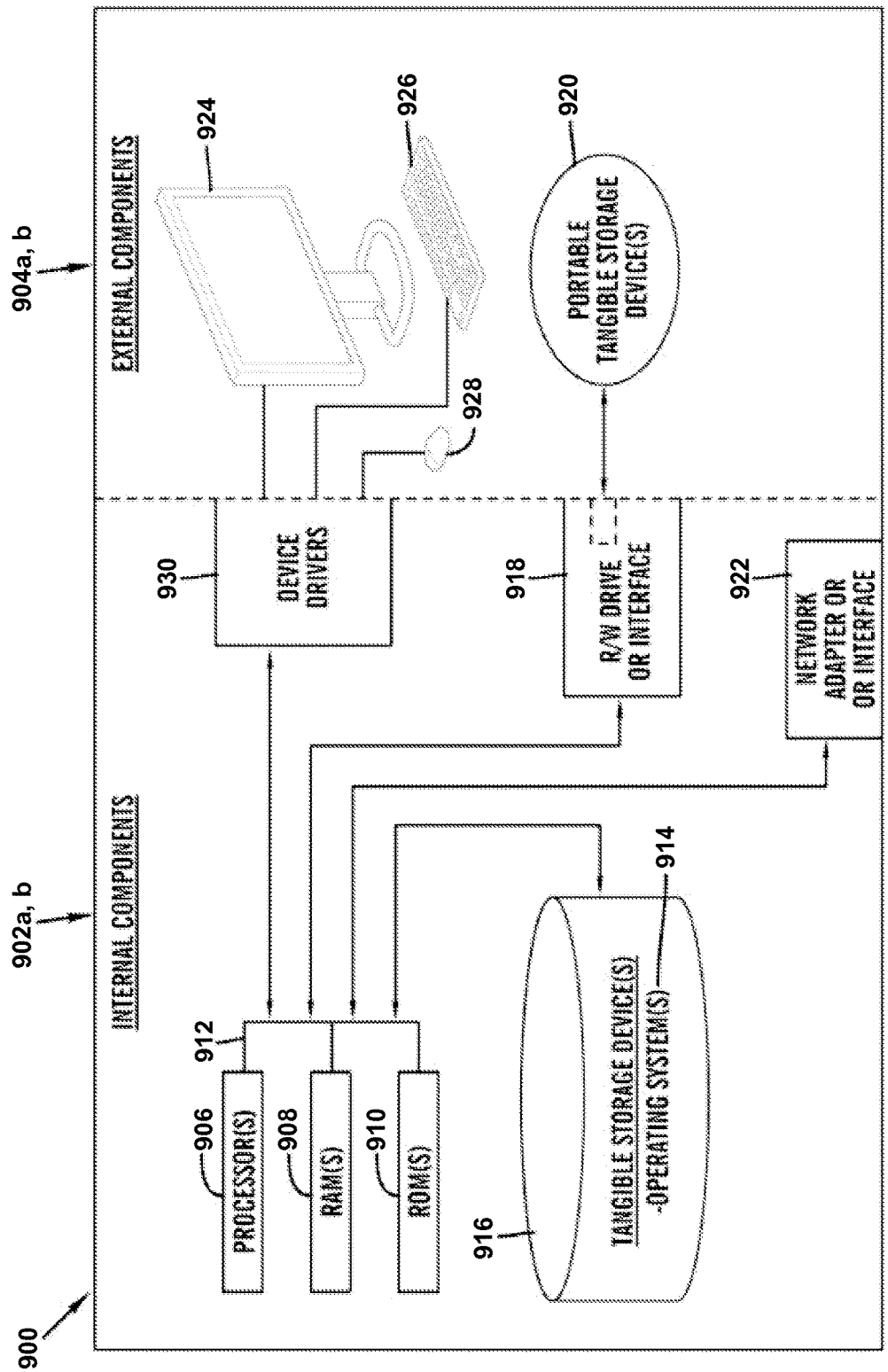
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 *a, b* and external components 904 *a, b* illustrated in FIG. 5. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the dynamic topic definition program 110*a* (FIG. 1) in client computer 102 (FIG. 1) and the dynamic topic definition program 110*b* (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the dynamic topic definition program 110*a* and 110*b* (FIG. 1) can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the dynamic topic definition program 110*a* (FIG. 1) in client computer 102 (FIG. 1) and the dynamic topic definition program 110*b* (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the dynamic topic definition program 110*a* (FIG. 1) in client computer 102 (FIG. 1) and the dynamic topic definition program 110*b* (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
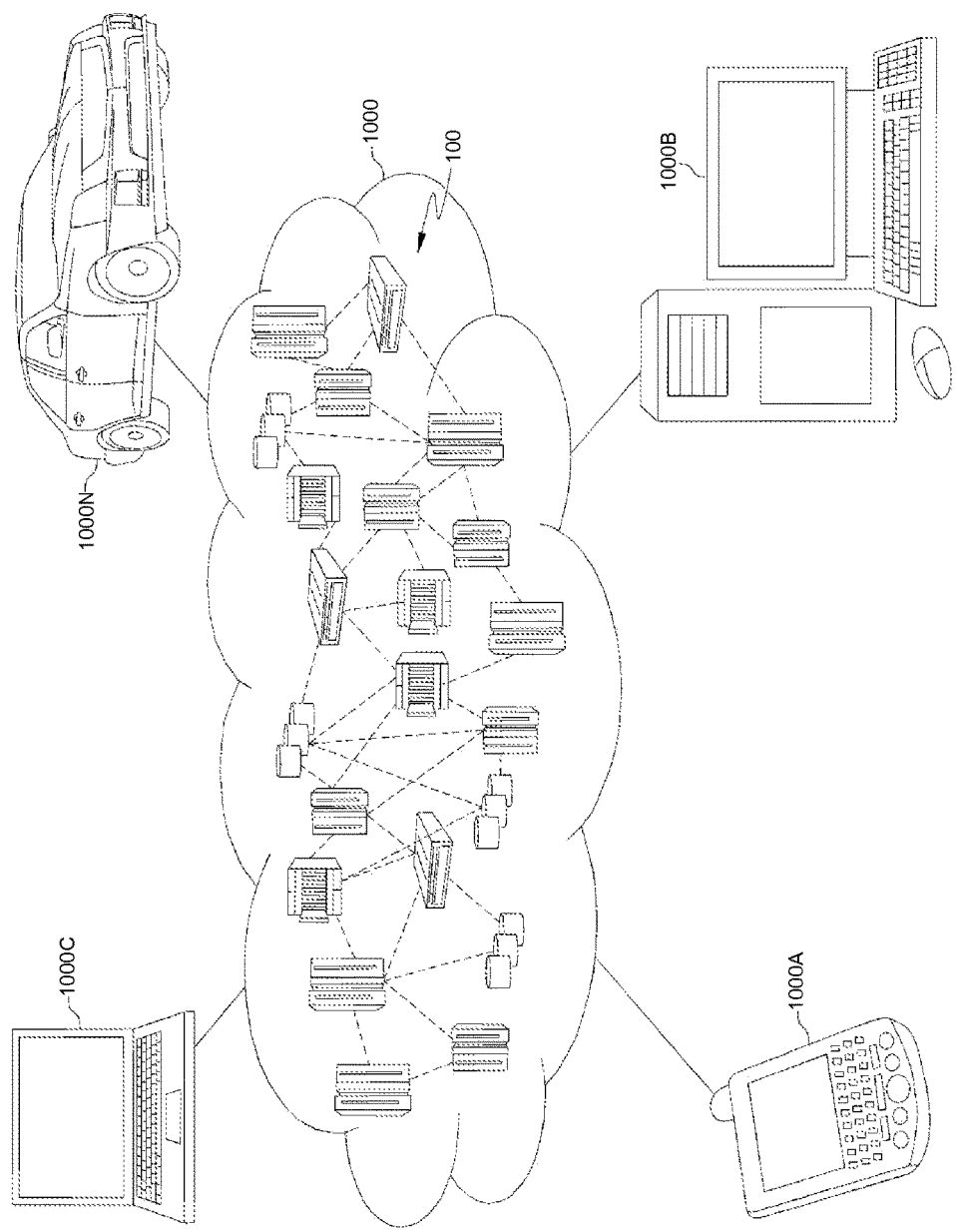
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
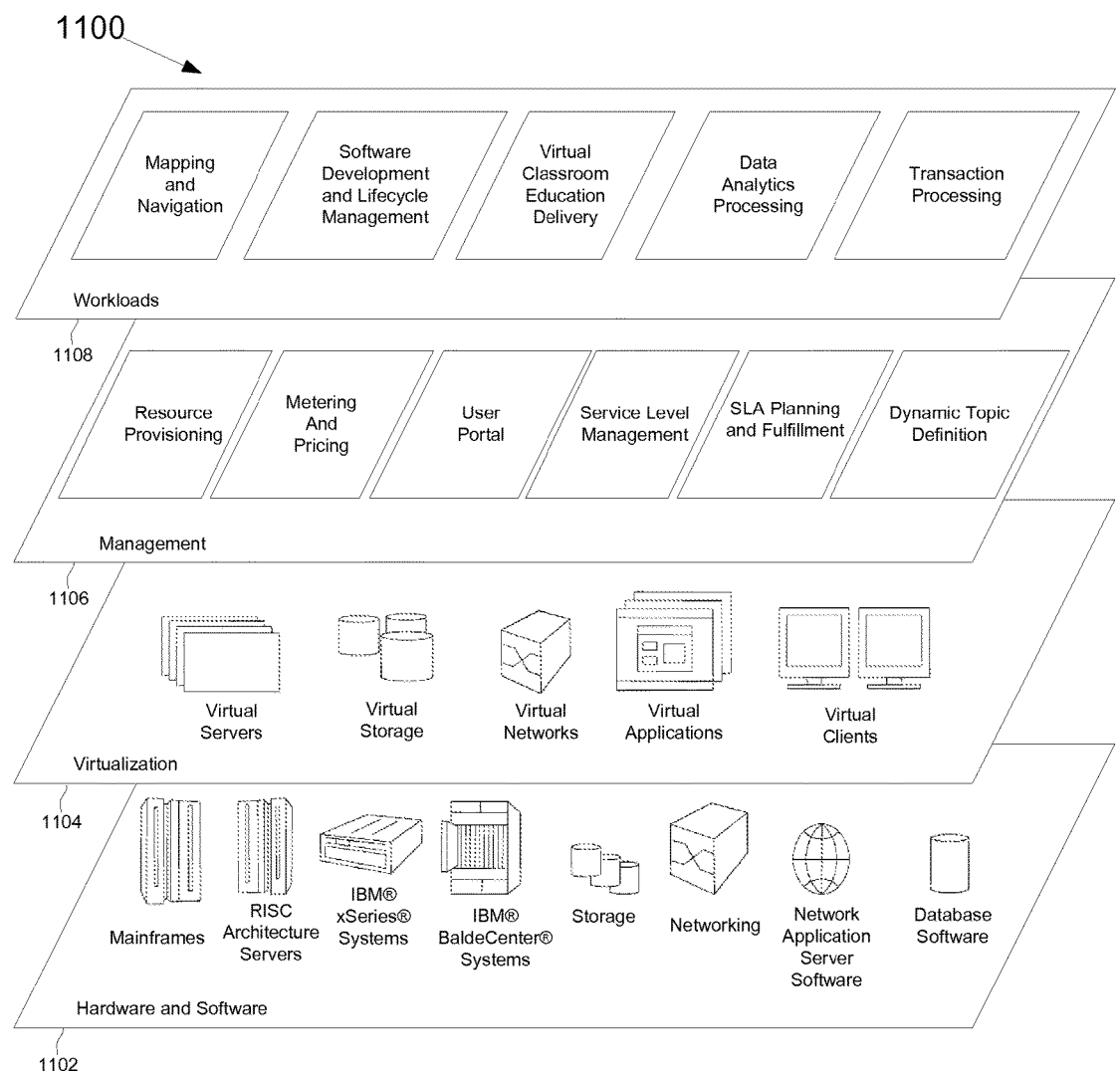
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Dynamic topic definition provides a way for a topic oriented question answer system to form supertopics from two or more topic within a single document or multiple related documents, whereby the topic oriented question answer system may use supertopics in addition to topics to generate answers to questions.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically defining a plurality of topics from at least one content object used to answer a question in a question answering system, the method comprising:
   receiving the at least one content object;
   receiving, from a user, ground truth data comprising a plurality of question-answer pairs, wherein the user identifies a plurality of answer topics associated with the plurality of question-answer pairs;
   identifying the plurality of topics within the received at least one content object;
   generating a graph based on the identified plurality of topics, wherein the generated graph includes a plurality of nodes connected by a plurality of edges, and wherein the plurality of nodes map to the identified plurality of topics;
   calculating edge weights associated with each edge within the plurality of edges based on the received ground truth data;
   determining if the calculated edge weight associated with an edge within the plurality of edges exceeds a threshold value, wherein the threshold value dynamically increases based on a number of nodes between a first node and an analyzed node in the generated graph, and wherein the edge is connected to the analyzed node; and
   generating a combination topic based on determining that the edge weight associated with the edge within the plurality of edges exceeds the threshold value by including a first topic mapped to the first node and a second topic mapped to the analyzed node within the generated combination topic.

2. The method of claim 1, wherein the combination topic comprises the topics associated with the nodes connected to the edge with the edge weight that exceeds the threshold value.

3. The method of claim 1, wherein the at least one content object comprises at least one text document having a plurality of formatting tags designating titles and headings.

4. The method of claim 3, wherein identifying the plurality of topics within the received at least one content object is based on the plurality of formatting tags.

5. The method of claim 1, further comprising:
   determining if the edge weight associated with the edge within the plurality of edges is less than a minimum threshold value; and
   removing the edge from the graph based on determining that the edge is less than the minimum threshold value.

6. The method of claim 1, further comprising:
   determining an answer based on the question and the combination topic.

\* \* \* \* \*